United States Patent
Mandl et al.

(10) Patent No.: US 11,873,961 B2
(45) Date of Patent: Jan. 16, 2024

(54) ILLUMINATION DEVICE FOR A MOTOR VEHICLE HEADLIGHT

(71) Applicant: ZKW Group GmbH, Wieselburg (AT)

(72) Inventors: Bernhard Mandl, Ober-Grafendorf (AT); Andreas Hölzl, Wieselburg (AT); Johann Steinkellner, St. Oswald (AT); Sunjung Park, Seoul (KR)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 18/024,570

(22) PCT Filed: Jul. 22, 2021

(86) PCT No.: PCT/EP2021/070589
§ 371 (c)(1),
(2) Date: Mar. 3, 2023

(87) PCT Pub. No.: WO2022/063460
PCT Pub. Date: Mar. 31, 2022

(65) Prior Publication Data
US 2023/0313962 A1   Oct. 5, 2023

(30) Foreign Application Priority Data

Sep. 23, 2020  (EP) .................................... 20197840

(51) Int. Cl.
*F21S 41/43* (2018.01)
*F21S 41/153* (2018.01)
(Continued)

(52) U.S. Cl.
CPC ............. *F21S 41/43* (2018.01); *F21S 41/147* (2018.01); *F21S 41/153* (2018.01);
(Continued)

(58) Field of Classification Search
CPC ........ F21S 41/43; F21S 41/265; F21S 41/255; F21S 41/153; F21S 41/147; F21W 2102/135
(Continued)

(56) References Cited

U.S. PATENT DOCUMENTS

2011/0205748 A1  8/2011  Yatsuda
2014/0009938 A1  1/2014  Hossfeld
(Continued)

FOREIGN PATENT DOCUMENTS

CN   108036277 A   5/2018
JP   2008181717 A   8/2008

OTHER PUBLICATIONS

International Search Report for PCT/EP2021/070589 dated Sep. 7, 2021 (13 pages).
(Continued)

*Primary Examiner* — Laura K Tso
(74) *Attorney, Agent, or Firm* — Eversheds Sutherland (US) LLP

(57) ABSTRACT

Illumination device (10) for a motor vehicle headlight, which comprises the following:
a first light module (100) for producing light distribution,
a bulb shield (300) having a bulb shield (300), which comprises an optically relevant shield edge (310) for producing a cut-off line,
a projection lens (400) with an optical axis (A), which is designed to image the light that can be produced by the first light module (100) in front of the illumination device (10), wherein the projection lens (400) is designed as a Fresnel lens, which Fresnel lens has a base body (410) and several annular steps (420) arranged on the base body (410), wherein each step (420) has a main surface (420a) to project the light
(Continued)

beams of the at least one light module (100) in front of the illumination device (10) and a sloping surface (420*b*) extending from the base body (410) to the main surface (420*a*), wherein the sloping surface (420*a*) forms a slope angle (W2) to the optical axis (A), and wherein the main surface (420*a*) and the sloping surface (420*b*) form a step edge (430) in a common surface section line, wherein the slope angle (W2) varies continuously along the circumference of a step edge (430).

13 Claims, 1 Drawing Sheet

(51) Int. Cl.
*F21S 41/255* (2018.01)
*F21S 41/147* (2018.01)
*F21S 41/265* (2018.01)
*F21W 102/135* (2018.01)

(52) U.S. Cl.
CPC ........... *F21S 41/255* (2018.01); *F21S 41/265* (2018.01); *F21W 2102/135* (2018.01)

(58) Field of Classification Search
USPC .................................................. 362/538, 539
See application file for complete search history.

(56) References Cited

U.S. PATENT DOCUMENTS

| 2015/0003081 | A1 | 1/2015 | Kobayashi et al. |
| 2019/0024871 | A1 | 1/2019 | Gloss et al. |
| 2019/0195455 | A1 | 6/2019 | Chen et al. |
| 2019/0277478 | A1 | 9/2019 | Streppel |

OTHER PUBLICATIONS

Search Report for European Patent Application No. 20197840.0 dated Feb. 16, 2021 (6 pages).

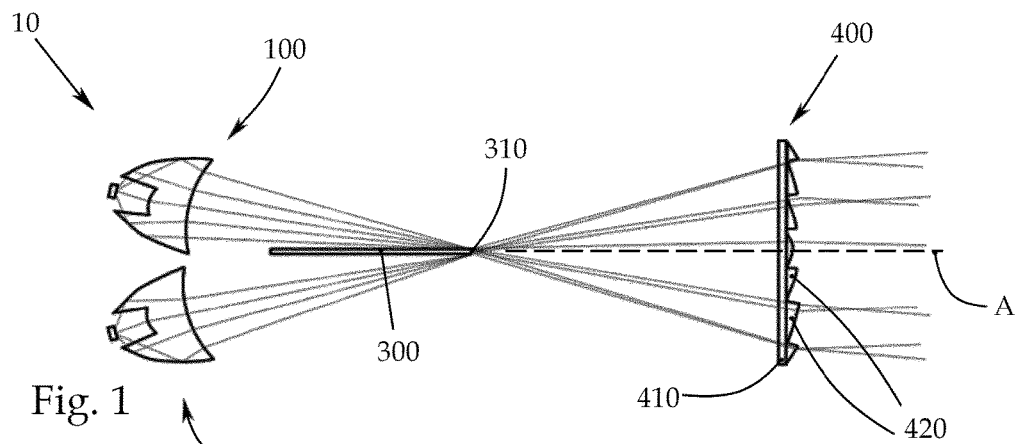
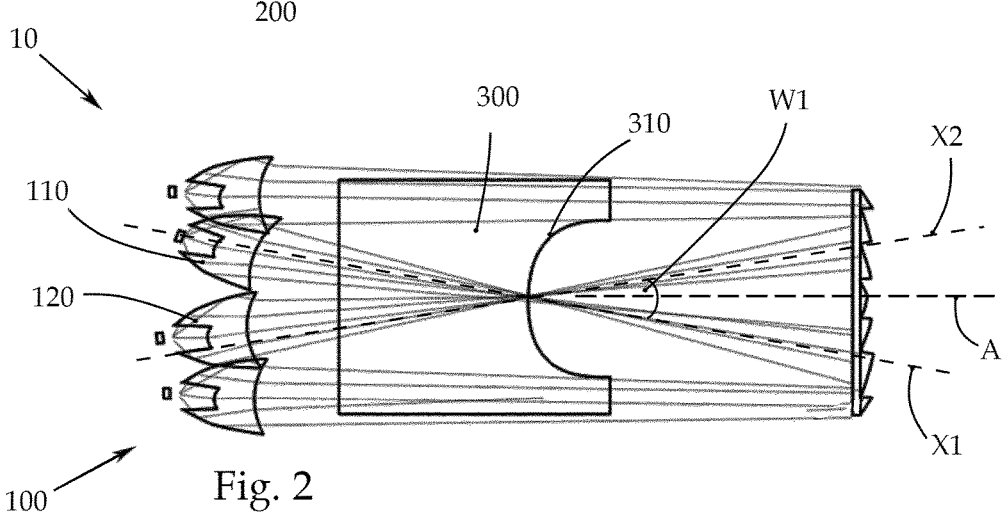
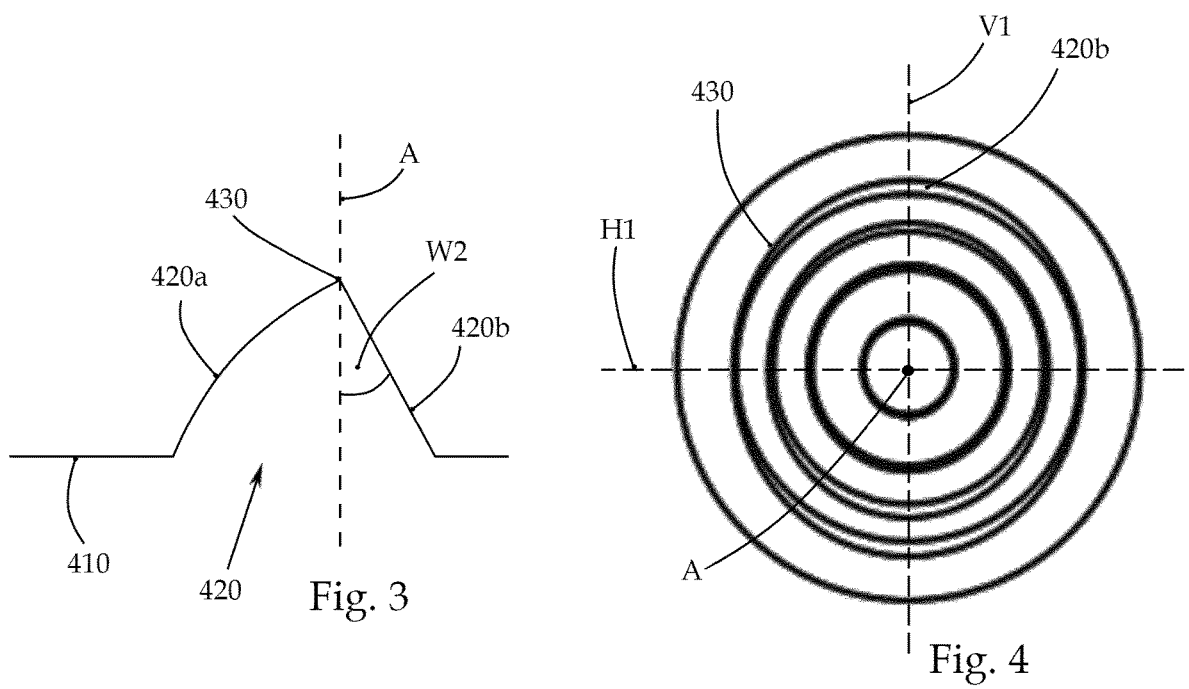

ILLUMINATION DEVICE FOR A MOTOR VEHICLE HEADLIGHT

The invention relates to an illumination device for a motor vehicle headlight, which illumination device comprises the following:
- at least one first light module for producing light distribution having at least one first and one second light source, wherein the first light source is designed to emit light in a first emission direction, and wherein the second light source is designed to emit light in a second emission direction, wherein the first and the second emission direction form an angle greater than zero degrees to each other,
- a bulb shield, wherein the bulb shield comprises an optically relevant shield edge for producing a cut-off line, wherein the first light module is arranged on an upper side of the bulb shield and cooperates in combination with the optically relevant shield edge of the bulb shield to produce light distribution,
- a projection lens with an optical axis, which is designed to image the light that can be produced by the first light module in front of the illumination device, wherein the projection lens is designed as a Fresnel lens, which Fresnel lens has a base body and several annular steps arranged on the base body, which steps are arranged substantially concentrically to one another, wherein each step has a main surface to project the light beams of the at least one light module in front of the illumination device and a sloping surface extending from the base body to the main surface, wherein the sloping surface forms a slope angle to the optical axis, and wherein the main surface and the sloping surface form a step edge in a common surface section line.

Furthermore, the invention relates to a motor vehicle headlight having at least one illumination device according to the invention.

A Fresnel lens (more precisely: a Fresnel stepped lens) is an optical lens, which enables the design of large lenses with a short focal length without the weight and volume of conventional lenses.

The reduction in volume in the Fresnel lens occurs as a result of a division into annular areas. The thickness is reduced in each of these areas giving the lens a series of annular steps. Given that light is only refracted at the main surface of the lens, the angle of refraction is not dependent on the thickness, but rather on the angle between the two surfaces of a lens. The lens therefore retains its optical properties although the image quality is negatively impacted by the step structure, but this does not matter in many applications. Examples of this are illumination beam paths for all types of headlights.

However, the sloping surface of each step can lead to undesired stray light, which can cause problems in many applications, particularly in the motor vehicle headlight industry, in which precise legal requirements have to be met.

It is an object of the invention to provide an improved illumination device.

This object is achieved by virtue of the fact that the slope angle varies continuously along the annular circumference of a step edge.

It can be provided that the first and the second light source are arranged in a horizontal plane in an installed state of the illumination device in a motor vehicle headlight.

It can be provided that the bulb shield has a longitudinal axis, wherein the longitudinal axis of the bulb shield is arranged in a horizontal plane in an installed state of the illumination device in a motor vehicle headlight, wherein the bulb shield comprises an optically relevant shield edge for producing an asymmetrical cut-off line, wherein the first light module is arranged on an upper side of the bulb shield and cooperates in combination with the optically relevant shield edge of the bulb shield to produce dipped beam distribution.

It can be provided that the slope angle varies continuously along the annular circumference of a step edge in such a way that a change in the slope angle follows a sinusoidal course, wherein the slope angle of each step along a vertical axis which intersects the optical axis of the Fresnel lens has a maximum of the respective step, and wherein the slope angle of each step along a horizontal axis which intersects the optical axis of the Fresnel lens has a minimum of the respective step.

Surprisingly, it has become apparent that a slope angle that is larger in the vertical direction than in the horizontal direction considerably reduces the stray light in the projected light distribution.

In general, the terms used in the following relating to a location or an orientation, such as "horizontal", "vertical", "in a horizontal direction", "in a vertical direction", "top", "bottom", in front of", "behind", "below", "above" etc. refer to a correct installation position of the illumination device in question in a motor vehicle headlight.

It can be provided that the maximum of the slope angle of the steps increases in a vertical direction starting from the optical axis.

It can be provided that the minimum of the slope angle of the steps increases in a horizontal direction starting from the optical axis.

It can be provided that the illumination device comprises at least one second light module having at least one light source to produce full beam distribution.

It can be provided that the second light module is arranged on a lower side of the bulb shield and helps to produce full beam distribution.

It can be provided that the minimum of the slope angle is 1 to 3 degrees along the horizontal axis.

It can be provided that the maximum of the slope angle is 3 to 12 degrees, preferably 3 to 6 degrees, in particular 6 degrees, along the vertical axis.

The object is also achieved by a motor vehicle headlight having at least one illumination device according to the invention.

The invention is explained below in more detail based on exemplary drawings. In the drawings, FIG. 1 shows an exemplary illumination device in a vertical cross section, having a first and a second light module and a projection lens formed as a Fresnel lens, wherein the Fresnel lens has a base body with several steps arranged in a ring, FIG. 2 shows the exemplary illumination device from FIG. 1 in a horizontal cross section, FIG. 3 shows a detail view of a step in a cross section, and FIG. 4 shows the front of the lens.

FIG. 1 shows an exemplary illumination device 10 for a motor vehicle headlight, which illumination device 10 comprises a first light module 100 for producing dipped beam distribution having at least one first and one second light source 110, 120, wherein the first and the second light source 110, 120 are arranged in a horizontal plane in an installed state of the illumination device 10 in a motor vehicle headlight, as can be seen in FIG. 2.

The first light source 110 is designed to emit light in a first emission direction X1, wherein the second light source 120 is designed to emit light in a second emission direction X2, wherein the first and the second emission direction X1, X2 form an angle W1 greater than zero degrees to each other, as can also be clearly seen in FIG. 2.

Furthermore, the illumination device 10 comprises a second light module 200 having at least one light source to produce full beam distribution.

Moreover, the illumination device comprises a bulb shield 300 having a longitudinal axis, wherein the longitudinal axis of the bulb shield 300 is arranged in a horizontal plane in an installed state of the illumination device 10 in a motor vehicle headlight, wherein the bulb shield 300 comprises an optically relevant shield edge 310 for producing an asymmetrical cut-off line, wherein the first light module 100 is arranged on an upper side of the bulb shield 300 and cooperates in combination with the optically relevant shield edge 310 of the bulb shield to produce dipped beam distribution.

The second light module 200 is arranged on a lower side of the bulb shield 300 and is designed to help to produce full beam distribution.

Furthermore, the illumination device 10 comprises a projection lens 400 with an optical axis A, which is designed to image the light that can be produced by the first light module 100 in front of the illumination device 10, wherein the projection lens 400 is designed as a Fresnel lens, which Fresnel lens has a base body 410 and several annular steps 420 arranged on the base body 410, which steps 420 are arranged substantially concentrically to one another, as shown, among others, in FIG. 4.

Each step 420 has a main surface 420a to project the light beams of the at least one light module 100 in front of the illumination device 10 and a sloping surface 420b extending from the base body 410 to the main surface 420a, wherein the sloping surface 420a forms a slope angle W2 to the optical axis A, and wherein the main surface 420a and the sloping surface 420b form a step edge 430 in a common surface section line, as shown in detail in FIG. 3. The optical axis A shown in FIG. 3 is an axis parallel to the optical axis of the Fresnel lens and is intended to illustrate the formation of the slope angle W2.

The slope angle W2 varies continuously along the annular circumference of a step edge 430 in such a way that a change in the slope angle W2 follows a sinusoidal course, wherein the slope angle W2 of each step along a vertical axis V1 which intersects the optical axis A of the Fresnel lens has a maximum of the respective step, and wherein the slope angle W2 of each step along a horizontal axis H1 which intersects the optical axis A of the Fresnel lens has a minimum of the respective step, as shown more clearly in FIG. 4.

If, for example, one goes clockwise around the annular course or circumference of the step edge 430 of a step 420 starting from the horizontal axis H1 (starting from FIG. 4, which shows a front of the Fresnel lens), the slope angle W2 is at a minimum directly at the horizontal axis H1, wherein the slope angle subsequently increases steadily or continuously until the slope angle of the corresponding step is at a maximum at the vertical axis V1. If one continues to follow the circumference of the step, the slope angle W2 decreases again until—having reached the horizontal axis H1 again—it has another minimum. The slope angle W2 then decreases again until—having reached the vertical axis V1 again—it has another maximum.

Furthermore, the maximum of the slope angle W2 of the steps increases in a vertical direction starting from the optical axis A, i.e. that starting from one step, the immediate next step that has a larger annular circumference of the step edge also has a larger maximum slope angle W2. This continues in the vertical direction or along the vertical axis V1. The maximum of the slope angle W2 along the vertical axis can vary from 3 to 10 degrees, preferably from 3 to 6 degrees.

Furthermore, the minimum of the slope angle W2 of the steps increases in a horizontal direction starting from the optical axis A, wherein what was said in the previous paragraph applies vice versa to the course of the minimum in the horizontal direction. The minimum of the slope angle W2 along the horizontal axis H1 can vary from 1 to 3 degrees.

The invention claimed is:

1. An illumination device (10) for a motor vehicle headlight, which illumination device (10) comprises:
    at least one first light module (100) for producing a light distribution having at least one first and one second light source (110, 120), wherein the first light source (110) is designed to emit light in a first emission direction (X1), and wherein the second light source (120) is designed to emit light in a second emission direction (X2), wherein the first and the second emission direction (X1, X2) form an angle (W1) greater than zero degrees to each other;
    a bulb shield (300), wherein the bulb shield (300) comprises an optically relevant shield edge (310) for producing a cut-off line, wherein the first light module (100) is arranged on an upper side of the bulb shield (300) and cooperates in combination with the optically relevant shield edge (310) of the bulb shield to produce light distribution;
    a projection lens (400) with an optical axis (A), which is designed to image the light that can be produced by the first light module (100) in front of the illumination device (10), wherein the projection lens (400) is designed as a Fresnel lens, which Fresnel lens has a base body (410) and several annular steps (420) arranged on the base body (410), which steps (420) are arranged substantially concentrically to one another, wherein each step (420) has a main surface (420a) to project the light beams of the at least one light module (100) in front of the illumination device (10) and a sloping surface (420b) extending from the base body (410) to the main surface (420a), wherein the sloping surface (420a) forms a slope angle (W2) to the optical axis (A), and wherein the main surface (420a) and the sloping surface (420b) form a step edge (430) in a common surface section line,
    wherein the slope angle (W2) varies continuously along the annular circumference of a step edge (430).

2. The illumination device according to claim 1, wherein the first and the second light source (110, 120) are arranged in a horizontal plane in an installed state of the illumination device (10) in a motor vehicle headlight.

3. The illumination device according to claim 1, wherein the bulb shield has a longitudinal axis, wherein the longitudinal axis of the bulb shield (300) is arranged in a horizontal plane in an installed state of the illumination device (10) in a motor vehicle headlight, wherein the bulb shield (300) comprises an optically relevant shield edge (310) for producing an asymmetrical cut-off line, wherein the first light module (100) is arranged on an upper side of the bulb shield (300) and cooperates in combination with the optically relevant shield edge (310) of the bulb shield to produce dipped beam distribution.

4. The illumination device according to claim 1, wherein the slope angle (W2) varies continuously along the annular circumference of a step edge (430) in such a way that a change in the slope angle (W2) follows a sinusoidal course, wherein the slope angle (W2) of each step along a vertical axis (V1) which intersects the optical axis (A) of the Fresnel lens has a maximum of the respective step, and wherein the slope angle (W2) of each step along a horizontal axis (H1) which intersects the optical axis (A) of the Fresnel lens has a minimum of the respective step.

5. The illumination device according to claim 1, wherein the maximum of the slope angle (W2) of the steps increases in a vertical direction starting from the optical axis (A).

6. The illumination device according to claim 1, wherein the minimum of the slope angle (W2) of the steps increases in a horizontal direction starting from the optical axis (A).

7. The illumination device according to claim 1, wherein the illumination device (10) comprises at least one second light module (200) having at least one light source to produce full beam distribution.

8. The illumination device according to claim 7, wherein the second light module (200) is arranged on a lower side of the bulb shield (300) and helps to produce full beam distribution.

9. The illumination device according to claim 1, wherein the minimum of the slope angle (W2) is 1 to 12 degrees along the horizontal axis (H1).

10. The illumination device according to claim 1, wherein the maximum of the slope angle (W2) is 3 to 12 degrees along the vertical axis.

11. A motor vehicle headlight having at least one illumination device (10) in accordance with claim 1.

12. The illumination device according to claim 10, wherein the maximum of the slope angle (W2) is 3 to 6 degrees along the vertical axis.

13. The illumination device according to claim 10, wherein the maximum of the slope angle (W2) is 6 degrees along the vertical axis.

* * * * *